United States Patent
Mirkin et al.

(10) Patent No.: US 6,973,332 B2
(45) Date of Patent: Dec. 6, 2005

(54) APPARATUS AND METHOD FOR FORMING COMPOUND WORDS

(75) Inventors: Eugene A. Mirkin, Cupertino, CA (US); Jens Nagel, San Francisco, CA (US)

(73) Assignee: Motorola, Inc., Schaumburg, IL (US)

( * ) Notice: Subject to any disclaimer, the term of this patent is extended or adjusted under 35 U.S.C. 154(b) by 29 days.

(21) Appl. No.: 10/692,621

(22) Filed: Oct. 24, 2003

(65) Prior Publication Data

US 2005/0096085 A1   May 5, 2005

(51) Int. Cl.⁷ .............................. H04B 1/38; G06F 3/04
(52) U.S. Cl. .................. 455/566; 455/550.1; 345/172; 715/533
(58) Field of Search .................. 455/566, 550.1, 455/466, 564; 345/172; 715/530–534

(56) References Cited

U.S. PATENT DOCUMENTS

| | | | |
|---|---|---|---|
| 4,701,851 A * | 10/1987 | Bass et al. .................. 715/533 |
| 5,815,093 A | 9/1998 | Kikinis | |
| 6,223,059 B1 * | 4/2001 | Haestrup ...................... 455/566 |
| 6,542,170 B1 | 4/2003 | Williams et al. | |
| 2002/0039899 A1 * | 4/2002 | Rossman ...................... 455/426 |
| 2003/0036411 A1 * | 2/2003 | Kraft ........................... 455/566 |
| 2003/0104839 A1 * | 6/2003 | Kraft et al. .................. 455/566 |
| 2003/0234821 A1 * | 12/2003 | Pugliese ...................... 345/816 |
| 2004/0093567 A1 * | 5/2004 | Schabes et al. ............. 715/533 |
| 2004/0177179 A1 * | 9/2004 | Koivuniemi ................. 710/67 |

* cited by examiner

*Primary Examiner*—Edward F. Urban
*Assistant Examiner*—Blane J. Jackson
(74) *Attorney, Agent, or Firm*—Hisashi D. Watanabe (57) ABSTRACT

A method and device for generating meaningful compound words is provided. A user interface (120, 212) is configured to receive data input corresponding to one or more compound words. A processor (206) is configured to identify word combinations of shorter words that may be combined to form a portion or all of the one or more compound words. A display (118, 208) is configured to show the word combinations in a priority based on one or more criteria, such as distinguishing word combinations having different quantities of shorter words.

15 Claims, 7 Drawing Sheets

| | WORD | CONSTITUENTS | SCORE (PROBABILITY) | RANK (SORT ORDER) | REASON FOR PLACEMENT | SAMPLE DICTIONARY |
|---|---|---|---|---|---|---|
| | *802* | *804* | *806* | *808* | *810* | *812* |
| 814 | ballgame | ball game | P(ball) + P(game) | 1 | well-formed, accumulative score of "ball" and "game" is higher than that of "call" and "hand" | ball |
| | | | | | | game |
| | | | | | | hand |
| | | | | | | call |
| 816 | aallgame | a all game | P(a) + P(all) + P(game) | 3 | worse than #1 and #2 in structure | all |
| | | | | | | help |
| 818 | ballhcof | ball h co f | P(ball) + P(h) + P(co) + P(f) | 4 | worse than all others in structure | 2u2 |
| | | | | | | command |
| | | | | | | code |
| 820 | Callhand | call hand | P(call) + P(hand) | 2 | well-formed, accumulative score of "ball" and "game" is lower than that of "call" and "hand" | frantic |
| | | | | | | classic |

402 — PredictCombinations (dictionary, input)
404 — 1. node[start] ← root[dictionary]
406 — 2. timesReset[start] ← 0
408 — 3. score[start] ← 0
410 — 4. string[start] ← ""
412 — 5. startNodes ← {start}
414 — 6. i ← 1
416 — 7. while i ≤ length[input]
  418 — a. allowedTransitions ← ResolveMapping(input[i])
  420 — b. hypotheses ← ∅
  422 — c. foreach x in startNodes
    424 — i. hypotheses ← hypotheses ∪ Move(x, allowedTransitions)
    426 — ii. ifIsComplete(x)
      428 — 1. node[temp] ← root[dictionary]
      429 — 2. string[temp] ← string[x]
      430 — 3. timesReset[temp] ← timesReset[x]+1
      432 — 4. score[temp] ← score[x] + Grade(node[x])
      434 — 5. hypotheses ← hypotheses ∪ Move(temp, allowedTransitions)
  436 — d. startNodes ← hypotheses
438 — 8. foreach y in startNodes
  440 — a. score[y] ← score[y] + Grade(node[y])
442 — 9. return startNodes

502 — Move(startNode, allowed Transitions)
504 — 1. newNodes ← ∅
506 — 2. foreach e in allowedTransitions
  508 — a. node[temp] ← δ(startNode,e)
  510 — b. timesReset[temp] ← timesReset[startNode]
  512 — c. score[temp] ← score[startNode]
  514 — d. string[temp] ← string[startNode]+e
  516 — e. newNodes ← newNodes ∪ {temp}
518 — 3. return newNodes

```
602 — if (a.numTimesReset != b.numTimesReset)
  604 — return (a.numTimesReset < b.numTimesReset);

606 — if (endOfInput)
    {
  608 — first=complete(a);
  610 — if (first != complete(b))
    612 — return first;
    }

614 — if (score[a] != score[b])
    {
  616 — return (score1 > score2);
    }
```

| WORD (802) | CONSTITUENTS (804) | SCORE (PROBABILITY) (806) | RANK (SORT ORDER) (808) | REASON FOR PLACEMENT (810) | SAMPLE DICTIONARY (812) |
|---|---|---|---|---|---|
| ballgame (814) | ball game | $P(ball) + P(game)$ | 1 | well-formed, accumulative score of "ball" and "game" is higher than that of "call" and "hand" | ball |
| aallgame (816) | a all game | $P(a) + P(all) + P(game)$ | 3 | worse than #1 and #2 in structure | game |
| ballhcof (818) | ball h co f | $P(ball) + P(h) + P(co) + P(f)$ | 4 | worse than all others in structure | hand |
| Callhand (820) | call hand | $P(call) + P(hand)$ | 2 | well-formed, accumulative score of "ball" and "game" is lower than that of "call" and "hand" | call |
| | | | | | all |
| | | | | | help |
| | | | | | 2u2 |
| | | | | | command |
| | | | | | code |
| | | | | | frantic |
| | | | | | classic |

FIG. 8

APPARATUS AND METHOD FOR FORMING COMPOUND WORDS

FIELD OF THE INVENTION

The present invention relates to the field of text entry systems that provide convenient and accurate processes for character and word input. More particularly, the present invention relates to a text entry system having intelligent formation capabilities of compound words that maximize the accuracy of the predictive text entry.

BACKGROUND OF THE INVENTION

Developers of portable electronic devices must implement user interfaces having a limited number of keys. Such developers have struggled with designing user interfaces for data entry of text, such as Roman characters, phonetic characters, ideographic characters, and strokes of ideographic characters. Portable electronic devices, such as a radiotelephone, typically have only twelve or so keys for entering the numbers "0" through "9" and symbols "*" and "#". It is quite challenging to design a portable electronic device that permits a user to input the numerous characters of a particular language using the limited number of keys in a standard keypad.

Current predictive text entry systems address many of the challenges of text entry for a standard keypad. For predictive text entry, the user presses a key once for each symbol and the system predicts the character that is being entered by the user. Predictive text entry is preferred because it requires, on average, fewer key presses for the entry of each symbol. However, current predictive text entry systems do not always accurately predict the user's intended text. Thus, an improved text entry system with better character and word prediction, particularly compound words, is desirable.

DETAILED DESCRIPTION OF THE PREFERRED EMBODIMENTS

The present invention is a user interface of a portable electronic device that provides for data entry of phonetic and ideographic characters as well as strokes of ideographic characters and, thus, applies to any language having letters, characters and/or words. The preferred embodiments, as shown in the drawings and described herein, are directed to a radiotelephone for wireless communication of voice and/or data signals and provides for data entry of Roman, phonetic and ideographic characters. However, it is to be understood that the present invention may be used for any type of electronic device such as, but not limited to, paging devices, computers, handheld devices, personal digital assistants, and the like.

Figure 1:
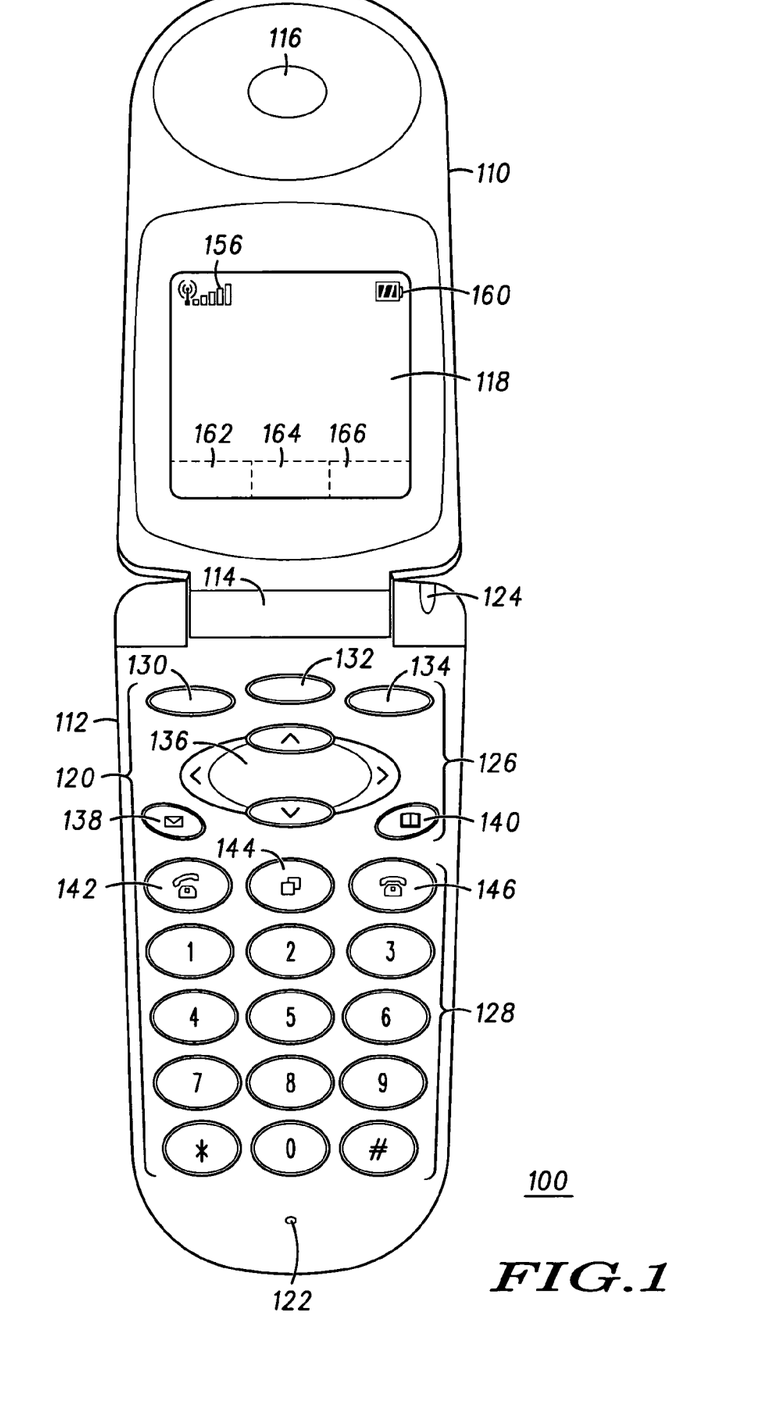
FIG. 1 is a perspective view of an exemplary portable electronic device in accordance with the present invention.

Referring to FIG. 1, there is shown a foldable, portable electronic device 100 having a top section 110 and a bottom section 112 movably joined at a joint section 114. The top section 110 includes an earpiece aperture 116 and a display 118, the bottom section 112 includes a user interface 120, a microphone aperture 122, and a visual indicator 124. The device 100 also includes other components of a radiotelephone (shown in FIG. 2) as described below, such as an antenna, power supply, external connectors, additional controls, and the like.

The user interface 120 of the present invention includes function keys 126 and keypad 128. For the device 100 shown in FIG. 1, the function keys 126 are located at an upper portion of the bottom section 112 and include menu selection keys 130, 132, 134, directional keys 136 (i.e., up, down, left and right), a message retrieval key 138, a memory key 140, a call answer key 142, a clear function key 144, and a call termination key 146. The function keys 126 of the present invention are not limited to those provided for the device 100 and may include other programmed or user-programmable control buttons such as volume control keys, voice recording keys, device setup controls, and the like.

The keypad 128 of the device 100 are located at a lower portion of the bottom section and include ten numeric keys, namely keys "1" through "9" and "0", as well as a "*" key and a "#" key for a total of 12 keys. As shown in FIG. 1, the keypad comprises a matrix of four rows in which each row includes three keys, similar to a typical telephone keypad. Although not shown in FIG. 1, the keypad 128 may also be used to input other types of symbols, such as Roman characters, phonetic characters, ideographic characters, and strokes of characters. For example, a typical set of keys of the keypad may associate characters A, B, C and 2 with key 2; D, E, F and 3 with key 3; G, H, I and 4 with key 4; J, K, L and 5 with key 5; M, N, O and 6 with key 6; P, Q, R, S and 7 with key 7; T, U, V and 8 with key 8; and W, X, Y, Z and 9 with key 9. Thus, each key may be used to input a number or character, depending upon the input mode of the device. For example, the input mode of the device may be determined by selection of one or more function keys, such as the menu selection keys 130, 132, 134.

The display 118 of the device provides various types of information to the user. Certain indicators are provided for general operation of the device, such as the signal strength indicator 156 and power indicator 160 of the device 100. Other indicators are provided for operation of the menu selection keys 130, 132, 134 of the function keys. For example, as shown by the device 100 in FIG. 1, there are three menu selection keys 130, 132, 134 provided at the top of the upper portion of the bottom section 112. Also, a bottom area of the display 118 is reserved for one to three menu selection indicators 162, 164, 166 that correspond to one or more of the menu selection keys 130, 132, 134.

Figure 2:
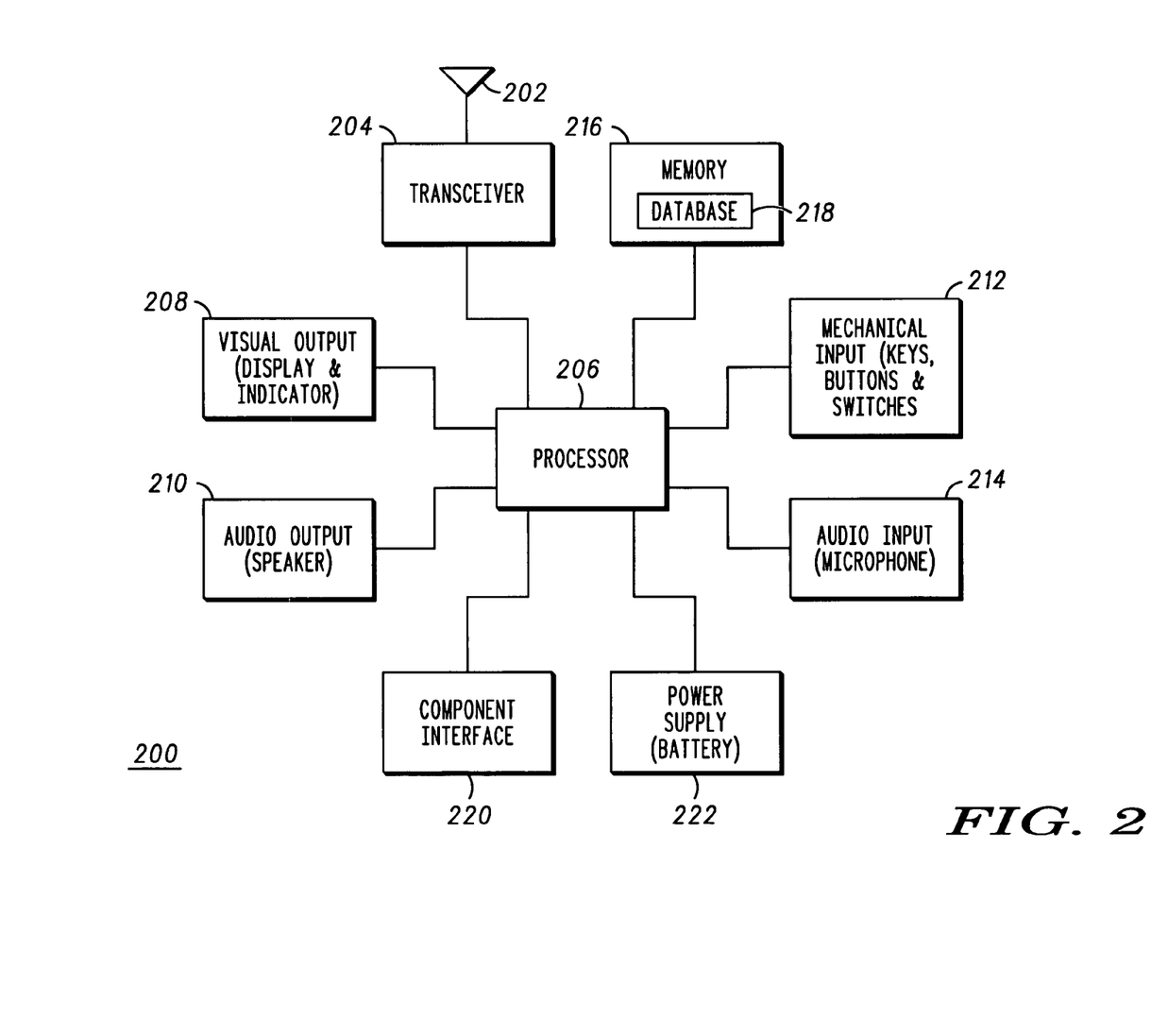
FIG. 2 is a block diagram of exemplary internal components of the portable electronic device of FIG. 1.

Referring to FIG. 2, internal components 200 of the portable electronic device 100 are shown. The preferred embodiment includes an antenna 202; a transceiver 204; a processor 206; output devices 208, 210; and input devices 212, 214. Upon reception of wireless signals, the internal components 200 detect the signals through the antenna 202 to producing detected voice and/or data signals. The transceiver 204, coupled to the antenna 202, converts the detected signals into electrical baseband signals and demodulates the electrical baseband signals to recover incoming information, such as voice and/or data, transmitted by the wireless signals. After receiving the incoming information from the transceiver 204, the processor 206 formats the incoming information for output to the output devices 208, 210. Likewise, for transmission of wireless signals, the processor 206 formats outgoing information and conveys it to the transceiver 204 for modulation of a carrier and conversion into modulated signals. The transceiver 204 conveys the modulated signals to the antenna 202 for transmission to a remote transceiver (not shown).

The input and output devices may include a variety of visual, audio and/or motion devices. The output devices may include, but are not limited to, visual outputs 208 (such as liquid crystal displays and light emitting diode indicators), audio outputs 210 (such as speakers, alarms and buzzers), and motion outputs (such as vibrating mechanisms). The input devices may include, but are not limited to, mechanical inputs 212 (such as keyboards, keypads, selection buttons, touch pads, capacitive sensors, motions sensors, and switches), and audio inputs 214 (such as microphones). For example, the top and/or bottom sections 112, 114 of the device 100 may includes a switch that is responsive to movement of the sections relative to each other and actuates one or more functions of the device as a result.

The internal components 200 of the portable electronic device 100 further include a memory portion 216 for storing and retrieving data. The processor 206 may perform various operations to store, manipulate and retrieve information in the memory portion 216. For example, the processor 206 may search the memory 226 for previously stored data by entering search elements or symbols from the user devices 212, 214. During search, the processor 206 compares stored data with the input search elements or symbols. If one or more matches are found, the matched data are provided to the output devices 208, 210 or further processed by the processor 206. For the preferred embodiments, the memory portion 216 stores a database or dictionary 218 of words or symbols that are considered to be complete words or characters in-and-of themselves. In addition, at least some of the words or symbols of the database 218 may combined to form word combinations that are considered to be complete words or characters. Thus, a word or character may be formed by either finding it in the database 218 or combining two or more words or symbols, i.e., two or more shorter words form a longer word. The processor 206 may reference the database 218 when predicting the words or characters desired by a user based on input received at the user interface 120.

The internal components 200 of the portable electronic device 100 may further include a component interface 220 and a power supply 222. Accessories and additional components may be coupled to the component interface 220 to provide additional functionality and capabilities to the device 100. The power supply 222 provides power to the internal components 200 so that they may function correctly, such as a battery.

Figure 3:
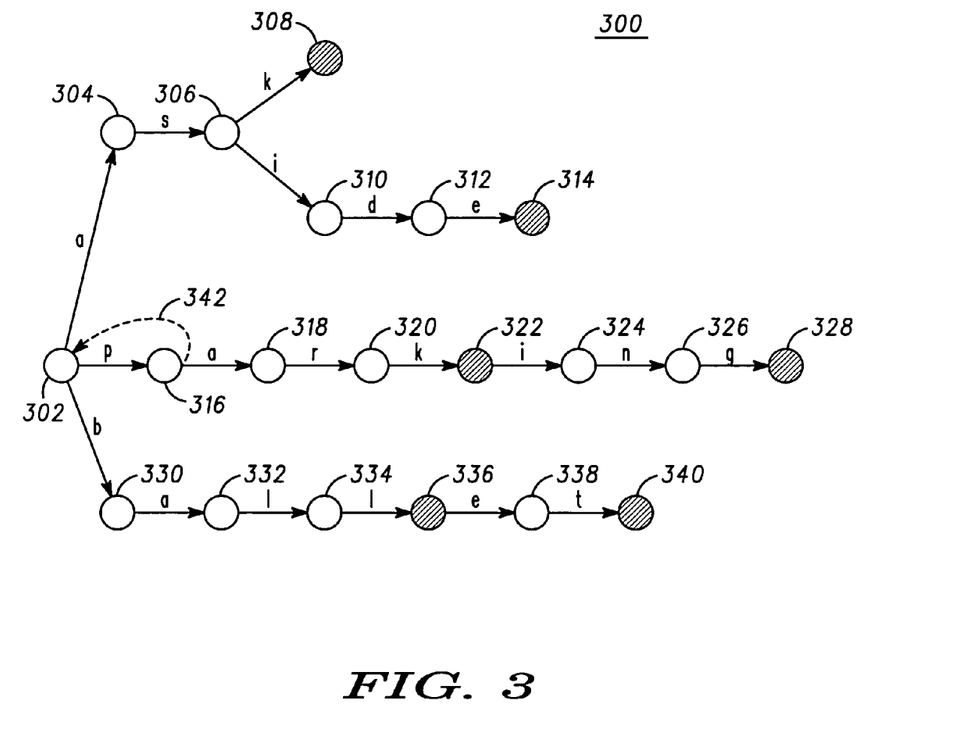
FIG. 3 is an exemplary diagram illustrating an operation of a predict combinations procedure that may be executed by the internal components of FIG. 2.

Referring to FIG. 3, there is provided an exemplary diagram 300 illustrating an operation of a predict combinations procedure 400 in accordance with the present invention. The exemplary tree diagram 300 includes a plurality of nodes (e.g., nodes 302 through 340) connected by vertices. The black nodes, e.g., nodes 308, 314, 322, 328, 336, 340, of the exemplary tree diagram 300 mark ends of complete words. Each vertex has a probability or score associated with it. Node 302 at the left the diagram 300 marks the first node of the tree and, by following the vertexes to progress through the tree, the predicted combinations are identifiable.

The exemplary tree diagram illustrates how the predict combinations procedure 400 may produce a plurality of predicted combinations from a certain set of inputs at the user interface 120. For example, as represented by FIG. 3, the predict combinations procedure 400 may generate the following predicted combinations from a single set of inputs: "ask" following nodes 302, 304, 306 and 308; "aside" following nodes 302, 304, 306, 310, 312 and 314; "park" following nodes 302, 316, 318, 320 and 322; "parking" following nodes 302, 316, 318, 320, 322, 324, 326 and 328; "ball" following nodes 302, 330, 332, 334 and 336; and "ballet" following nodes 302, 330, 332, 334, 336, 338 and 340. The exemplary tree diagram shown in FIG. 3 represents an example where a user selects key "7" followed by key "2" as an initial portion of an input. As described above, key "7" may correspond to characters "p", "q", "r", "s" or "7", and key "2" may correspond to characters "a", "b", "c" or "2". The predict combinations procedure 400 may, for example, identify the six combinations represented by FIG. 3, i.e., "ask", "aside", "park", "parking", "ball" and "ballet", based on the received input. It should be noted that, for this example, only two of these combinations, namely "park" and "parking", actually include a character corresponding to key "7"; the remaining combinations begin with characters corresponding to key "2". As represented by loop 342, the prediction combinations procedure 400 may try to identify combinations beginning with the first key, e.g., key "7", and also try to identify combinations beginning with a subsequent key, e.g., key "2". Thus, the prediction combinations procedure 400 is capable of considering and identifying word combinations that make-up a portion of an input as well as the input in its entirety.

Figure 4:
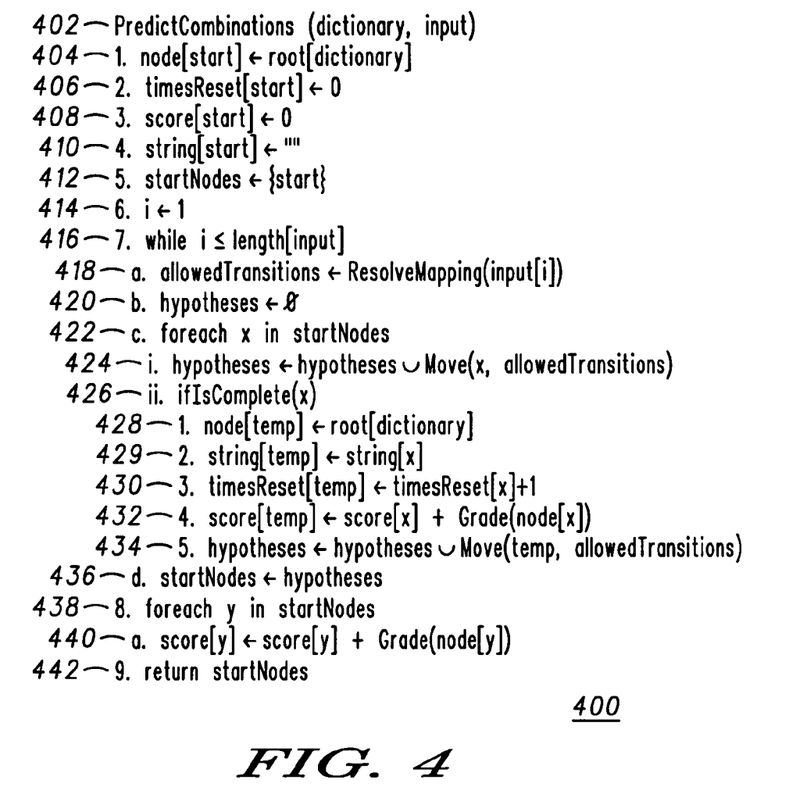
FIG. 4 is a pseudo code diagram of a predict combinations procedure that may be executed by the internal components of FIG. 2.

Referring to FIG. 4, there is provided a pseudo code diagram of a predict combinations procedure 400. In particular, determinism may be maximized to a computational model, such as the finite automata model shown in the figure. The computational model is a function utilizing variables and functions including, but not limited to, a set of states, an alphabet of a database, a currentState variable, a set of terminal states, and a transition function. The set of states may include all potential predictions in the form of paths and their junctions, such as a starting point. The alphabet of the database includes all characters available for a particular language or language type. The currentState variable includes all new states and all restarted states of the set of states. The set of terminal states is a subset of the set of states and includes ending points of the paths. The transition function defines how the predict procedure 400 switches between two consecutive states and is preferably a function of the set of states and the alphabet of the database.

The predict procedure 400 includes an unambiguous transition function that provides forward progress as well as conditional restarting at every point. In doing so, the predict procedure 400 allows for the creation of compound words, i.e., new words based on existing words in a database. Once new words are identified, they are considered along with the existing words for future analysis.

As shown in FIG. 4, the predict procedure 400 initiates its search for word combinations at line 402, in which dictionary information and a given input are utilized by the procedure. As described above, the dictionary information may be stored at database 218 and the input may be received as a sequence of virtual keys from the user interface 120.

The predict procedure 400 may be executed by an electronic circuit that includes a processor, memory and user interface, such as the processor 206, the input devices 212 and the memory portion 216 shown in FIG. 2. The predict procedure 400 starts by initializing certain variables at lines 404 through 414. For example, the processor 206 sets the currentState variables to a dictionary root at line 404, set TimesReset and Score to zero at lines 406 & 408, set the Character String to an empty value at line 410, indicate that the current node is the starting node at line 412, and set variable i to its initial value (in preparation of a subsequent loop), which may be stored in the memory portion 216.

The predict procedure 400 then moves sequentially through input states, as represented by a first loop function based on length of input at line 416 and the steps encompassed by the first loop, i.e., lines 416 through 426. For example, as represented in FIG. 4, the first loop is executed for each character or symbol of the received input. Next, the Allowed Transitions is set to a resolved mapping of the current input at line 418. For example, for data entry keys having Roman characters, key 2 may be mapped to letters A, B and C as well as the number 2. The mapping will vary from language to language and from device to device based on the number of characters or symbols to be mapped and the number of input possibilities available at the user interface. The hypotheses are set to zero to initialize the destination nodes at line 420. All of the above variables may be stored in the memory portion 216 by the processor 206.

A state is basically a position inside a word. Thus, a dictionary root is a position in every word such that all characters of the word follow. As we explore transitions in every iteration of the ("input") loop 416, we move this position pointer forward. Following a character transition from one state to another means advancing from one position to another if the next character matches the one of the transition action.

Within the first loop represented by line 416, there is a second loop represented by line 422. For this second loop, the predict procedure 400 moves sequentially through all states stored in the startNodes variable based on the length of these states, as represented by line 422 and the steps encompassed by the second loop, i.e., lines 424 through 434. For example, as represented in FIG. 4, the second loop is executed for each state stored in the startNodes variable. Thereafter, the predict procedure executes based on certain parameters.

Figure 5:
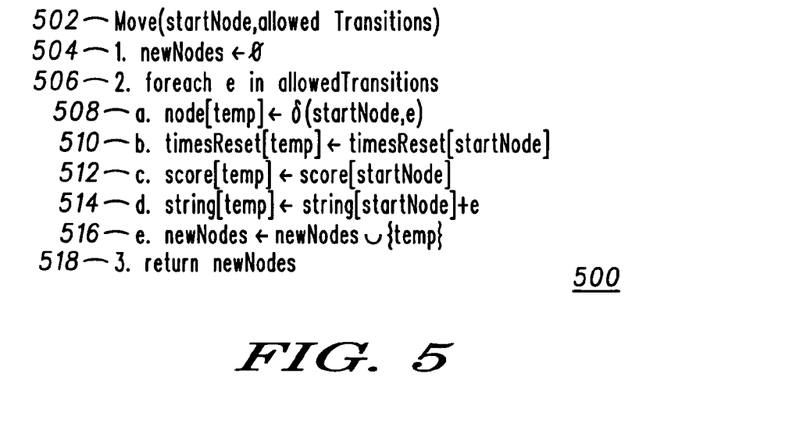
FIG. 5 is a pseudo code diagram of a move procedure that may be called by the predict combinations procedure of FIG. 4.

Referring to FIG. 5, there is provided a pseudo code diagram of an exemplary transition function 500, such as a move procedure, that may be called by line 424 (and, as described below, line 434) of the predict combinations procedure of FIG. 4. As represented by line 502, the transition function 500 requires two parameters, namely a currentState variable, i.e., startNode, which is available and a character on input mapped to a corresponding key, i.e., allowedTransitions, to set New States. Thus, each time the transition function 500 is executed, a plurality of new characters or symbols become possible additions to the end of the currentState variables. The transition function 500 also initializes a variable for tracking new nodes at line 504. Thereafter, the transition function 500 executes a loop to process new nodes. In particular, the transition function 500 executes the loop for each character of the allowedTransitions at line 508. This is not just a temporary location but a temporary node (which is added to new nodes at step 516). The transition function 500 then identifies a new node based on the vertex reached from a startNode by following a directed edge of the current character or input at line 508.

Next, the transition function 500 stores the timesReset value and the score value of the startNode at temporary locations at lines 510 and 512 in order to keep these old values. The transition function 500 then concatenates the old string with the edge at line 514. Thereafter, the node is added to the results at line 516. Finally, the newly processed nodes are returned to the predict procedure 400 at line 518.

Returning to FIG. 4, the predict procedure 400 determines whether the currently considered substates include of a complete word at line 426. This check is performed to determine whether it makes sense to reset the current start state. For example, the processor 206 may compare the substates of the startNodes variable to the database 218 of the memory portion 216 to determine whether any matches occur. If so, the predict procedure 400 also includes non-deterministic hypotheses. Accordingly, the predict procedure 400 prepares to restart the hypothesis by setting a current node to a dictionary root at line 428, setting a temporary string variable at line 429, and increments a TimesReset variable to track the number of times a complete word is identified for a particular path analyzed for the input at line 430. The predict procedure 400 then grades the complete portion before restarting by adding a grade associated with the node to a score for the current combination at line 432. Various methods of grading the substates may be applied, such as likelihood of occurrence based on frequency of usage. In addition to grading the particular substate being considered, the predict procedure 300 would also calculate a combined score for this substate with any other previously identified substate, if any, for the currently considered input. Next, the predict procedure 400 utilized the transition function to determine the restarted states in view of the newly discovered complete word in line 434. Next, the predict procedure 400 stores all generated hypotheses at line 436 so that they may be used for subsequent steps. Thereafter, the loop of line 422 continues until all possibilities have been considered. Otherwise, if a complete word is not identified at line 426, then the predict procedure 400 moves on to the next size of substates by returning to line 422 and determining whether these substates of incrementally larger size include a complete word at line 426 once again.

Finally, the new currentState variables are compiled in a list of currentState variables for processing at a later stage, as described below. The predict procedure 400 continues to identity and process complete words, via loop 426, until all possible word combinations for every possible path, via loop 416, of the input have been reviewed and a complete list of currentState variables is created. The predict procedure 400 then grades all results after processing all virtual keys at lines 438 and 440. Finally, the predict procedure 400 returns all accumulated strings and terminates at line 442. It should be noted that, for another embodiment, the predict procedure 400 may limit or otherwise adjust the number of hypotheses made available for subsequent stages to prevent an exponential explosion of the amount of hypotheses. Such limitation or adjustment may be based on the processing capabilities of the device utilizing this predict procedure 400.

The general operation of the predict procedure 400 may be explained as follows. A particular match or known combination is found by traversing a dictionary path throughout an entire character sequence. The match fails for a particular match if a transition is not available for the match. Other matches may be successful, because each key may be mapped to several characters, e.g., key 2 is mapped to characters A, B, C, & 2. For example, for the user-entered key combination of 2-2-7, "ca" is one of the matched combinations after processing the first two key entries. The machine then explores the third key entry, i.e. 7, by analyzing all transitions mapped to this character, such as "p", "q","r","s" and "7". In the process, the machine may identify one or more words. For the above example, the machine may identify the words "car", "cap" and "car".

It is to be understood that the last characters do not necessarily indicate the last character of a word. On the other hand, the machine is capable of eliminating certain combinations based on the likelihood of forming a known combination. For example, the likelihood of finding a match for any word starting with "caq" is low, so the machine may dismiss this possibility.

Figure 6:
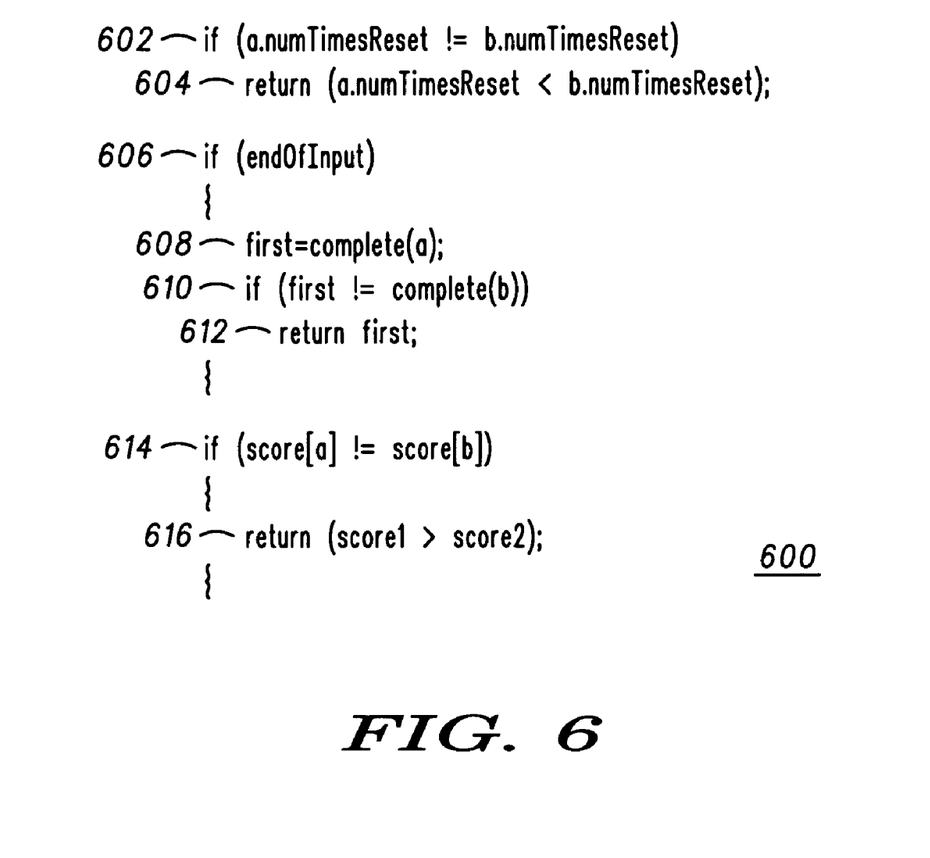
FIG. 6 is a pseudo code diagram of a compare combinations procedure that may be executed by the internal components of FIG. 2.

Referring to FIG. 6, there is provided a pseudo code diagram of a compare combinations procedure 600. In particular, this compare procedure 600 analyzes two or more currentState variables of the currentState variables list, created by the predict procedure 400 shown in FIG. 4, and prioritizes the currentState variables based on one or more criteria. For example, the compare procedure 600 represented by FIG. 6 prioritizes two or more currentState variables based on the number of words combined to form each word combination, whether each word combination is complete, and scores associated with each word combination. The compare procedure 600 includes, but is not limited to, the criteria represented by FIG. 6. Also, if multiple criteria are utilized, the criteria themselves may be prioritized so that some criteria weigh more heavily on the final decision than other criteria.

In FIG. 6, the compare procedure 600 starts by identifying two currentState variables, i.e., state "a" and state "b", from the currentState variables list. The compare procedure 600 determines whether the two states have the same number of TimesReset at line 602. In other words, the word combination of state "a" is compared to the word combination of state "b" to determine whether they include the same number of smaller words.

If the two states have a different number of TimesReset, then the compare procedure 600 determines which state has the lesser number of TimesReset at line 604, thus the lesser number of smaller words and is more likely to be the word combination desired by the user. For example, if the number of smaller words of state "a" is less than the number of smaller words of state "b", then the compare procedure 600 determines that state "a" should have a higher priority than state "b" at line 604. Thus, the hypothesis "state 'a' is better than state 'b'" returns a TRUE result, and the compare procedure 600 terminates. On the other hand, for this example, if the number of smaller words of state "a" is not less than the number of smaller words of state "b" at line 604, then the compare procedure 600 determines that state "b" should have a higher priority than state "a". In other words, the hypothesis "state 'a' is better than state 'b'" returns a FALSE result, and the compare procedure 600 terminates.

In line 602, if the two states have the same number of TimesReset, then another criteria must be used to determine which state should have higher priority. In such case, the compare procedure 600 moves on to line 606 to determine whether the end of the input has been reached, because complete words are preferred. If so, the compare procedure 600 determines whether the two states produce similar results when analyzed for completeness at lines 608 through 612. In particular, the compare procedure 600 determines whether state "a" is complete at line 608; the result is TRUE if state "a" is complete, FALSE if state "a" is not complete. The compare procedure 600 then determines whether state "b" is complete at line 610; the result is TRUE if state "b" is complete, FALSE if state "b" is not complete. Also, at line 610, the compare procedure determines whether states "a" and "b" generated the same result for completeness. If state "a" is a word combination in its entirety and state "b" is not a word combination in its entirety, or vice versa, then the result in determining the completeness of state "a" is the final result at line 612; TRUE if state "a" is complete but state "b" is not complete, FALSE if state "a" is not complete but state "a" is complete. The compare procedure 600 determines which state is a word combination in its entirety and, thus, is more likely to be the word combination desired by the user. Thereafter, the compare procedure 600 terminates.

If, on the other hand, both state "a" and state "b" are word combinations in their entirety or neither state "a" nor state "b" is word combinations in its entirety, then another criteria must be used to determine which state should have higher priority. Thus, the compare procedure 600 moves on to line 614 to determine which state is associated with a higher score. For this step, any type of method for scoring or grading substates may be applied, such as likelihood of occurrence based on historical frequency. If state "a" has a higher score than state "b", then the compare procedure 600 determines that state "a" should have a higher priority than state "b". If a score for state "a" is different from a score for state "b" at line 614, then the compare procedure 600 determines whether the score for "a" is higher than the score for "b". If the hypothesis "state 'a' is better than state 'b'" is true, then the compare procedure 600 returns a TRUE result. On the other hand, for this example, if state "a" does not have a higher score than state "b", then the hypothesis "state 'a' is better than state 'b'" returns a FALSE result. Thereafter, the compare procedure 400 terminates. For the preferred embodiment, the compare procedure 400, as shown in FIG. 6 and described above, is executed by the processor 206 and utilizes the memory portion 216.

It should be noted that the last criteria to be considered by the compare procedure 600 may not clearly determine the better state, i.e., the state with higher priority. For example, for the example shown in FIG. 6, the score of state "a" may be equal to the score of state "b" and, thus, state "a" and state "a" are equal based on all criteria considered by the compare procedure 400. In such case, a default decision may be predetermined in order to accomplish the prioritization. For example, as shown in FIG. 6, if the score of state "a" is equal to the score of state "b" at line 614, then by default state "a" is considered to have higher priority than state "b" and the hypothesis "state 'a' is better than state 'b'" returns a TRUE result at line 616.

Figure 7:
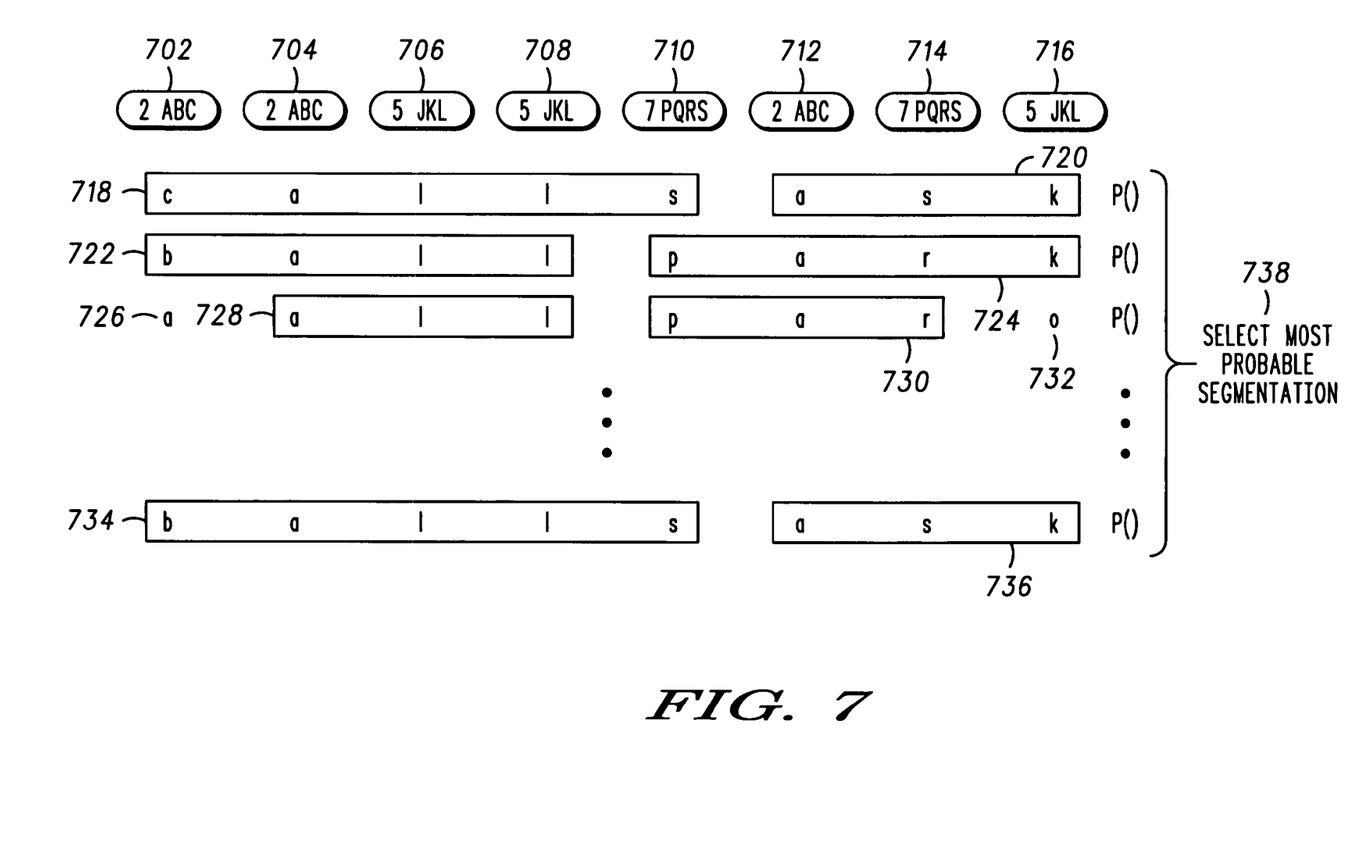
FIG. 7 is a word list representing a comparison of exemplary word combinations based on FIG. 4.
Figure 8:
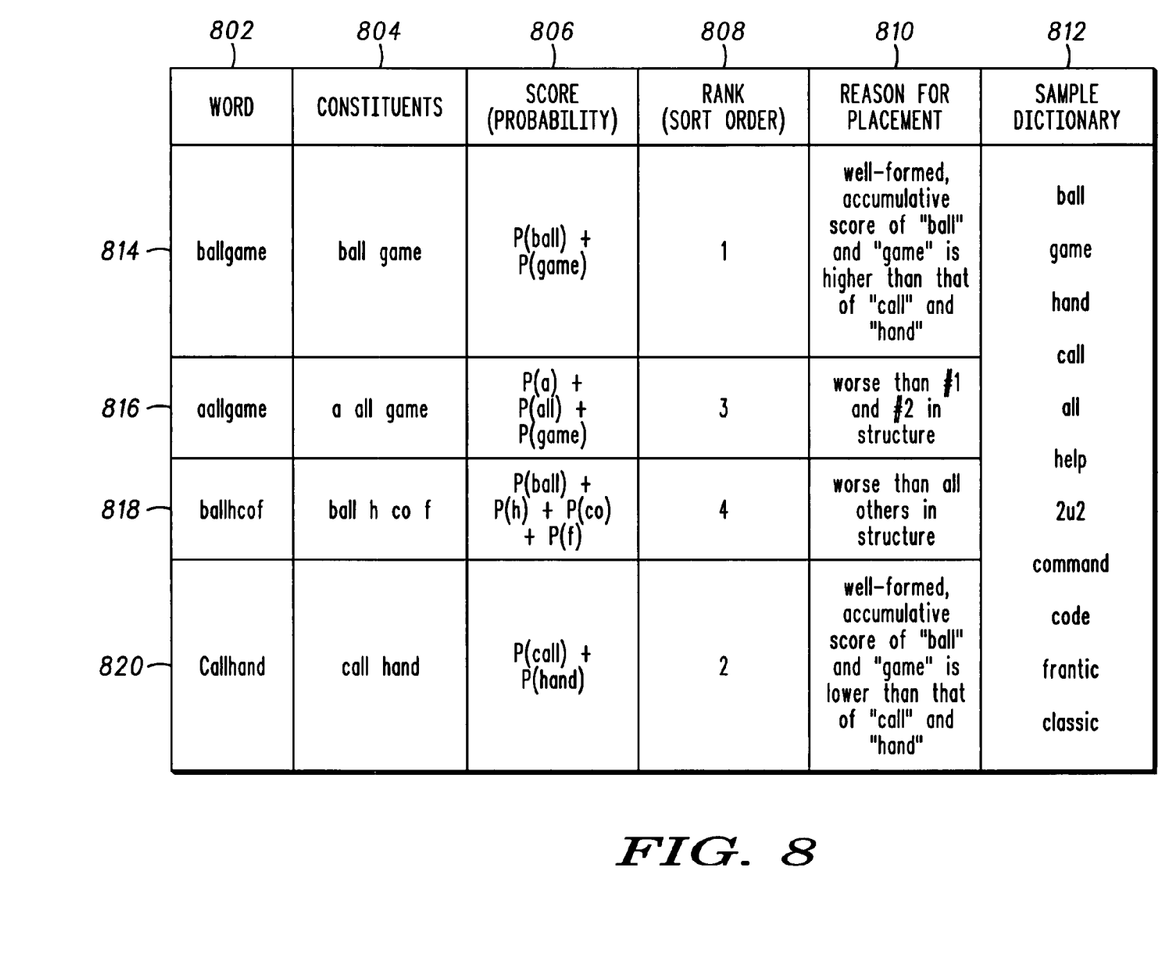
FIG. 8 is a word table representing another comparison of exemplary word combinations based on FIG. 4.

Referring to FIGS. 7 and 8, there are provided a word list and word table representing a comparison of exemplary word combinations. The word list of FIG. 7 and the word table of FIG. 8 are presented herein as examples to further describe the capabilities of the components and procedures shown in FIGS. 1 through 6 and described above. Accordingly, the specific elements shown in FIGS. 7 and 8 and described hereafter should not be used to limit the scope of the present invention.

FIG. 7 exemplifies a full string evaluation that may be accomplished by utilizing the present invention. The full string evaluation analyzes an entire virtual key sequence or string after each key selection of the user interface 120. The full string evaluation segments the string into possible substrings that match entries in the database 218 and weighs them according to their likelihood. Based on one or more criteria, the string combinations are prioritized. For example, the string combination having the fewest complete segments and/or the highest combined likelihood may be selected as the best choice or selection.

For the example shown in FIG. 7, it is assumed that key selections were entered at the user interface 120 in a particular order, namely 2-2-5-5-7-3-7-5, as represented by a top portion 702–716 of the figure. Each of a first key 702, a second key 704 and a sixth key 712 represents characters A, B, C and 2; each of a third key, a fourth key and an eighth key represents characters J, K, L and 5; and each of a fifth key and a seventh key represents characters P, Q, R, S and 7. Four possible word combinations are also shown in FIG. 7, namely "callsask" 718, 720; "ballpark" 722, 724; "allpar" 728, 730; and "ballsark" 734, 736. The first possible word combination includes the smaller words "calls" 718 and "ask" 720, the second possible word combination includes the smaller words "ball" and "park" 724, the third possible word combination includes the smaller words "all" 728 and "par" 730, and the fourth possible word combination includes the smaller words "balls" 734 and "ark" 736. The present invention may prioritize these possible word combinations by selecting the most probable segmentation as indicated by resulting area 738.

If the compare combinations procedure 600 of FIG. 6 is used to analyze these possible word combinations, the currentState variables that include word combinations would be compared two-at-a-time, starting at the top of the list. So long as the earlier currentState variable has a higher priority that a later currentState variable, the order of the list does not change and the compare procedure 600 continues to move down the list. If a later currentState variable has a higher priority that an earlier currentState variable, then the order of the two states is reversed and the currentState variable with the higher priority continues to move up the list until it is compared to another currentState variable having an even higher priority. Then, the operation returns to the point where analyzed currentState variables meet non-analyzed currentState variables and continues to compare states two-at-a-time. This operation continues until the entire list has been analyzed and sorted.

For example, the compare procedure 600 may compare the first possible word combination 718, 720 to the second possible word combination 722, 724 and determine that the TimesReset are equal and the completeness of each currentState variable is equal. However, the second possible word combination 722, 724 may receive a higher priority than the first possible word combination 718, 720 based on likelihood of occurrence and, thus, the order of these combinations may be reversed. Next, the compare procedure 600 may compare the first possible word combination 718, 720 to the third possible word combination 728, 730 and determine that the TimesReset are equal. However, the compare procedure 600 may consider the currentState variable of the first possible word combination 718, 720 to be a word combination in its entirety but it may consider the currentState variable of the third possible word combination 728, 730 to be otherwise because the currentState variable includes at least one addition character, i.e., character "a" 726 and character "o" 732. Thus, the order of the first possible word combination 718, 720 and the third possible word combination 728, 730 would not change. Thereafter, the third possible word combination 728, 730 would be compared to the possible word combination.

FIG. 8 exemplifies the determination of sort order based on the orthographical structure of results. The word table of FIG. 8 includes columns for possible word combinations 802, constituents or segmented smaller words 804, score 806 for the corresponding word combination, rank 808 of the corresponding word combination, reason 810 for priority placement for the corresponding word combination, and a sample dictionary 812 for storing smaller words. The possible word combinations 802 may be input received at the user input 120. The constituents and score may be determined by a predict procedure, such as the predict procedure 400 shown in FIG. 4. For one embodiment, the score for each word combination is determined by determining a score for each shorter word of the word combination and combining the scores of all shorter words of the word combination. The score for each shorter word may be determined by probability or some other method of evaluation. The rank or priority may be determined by a compare procedure, such as the compare procedure shown in FIG. 6. The sample dictionary may be a possible equivalent of the database 218 stored in the memory portion 216.

The procedures described herein are preferably designed for static dictionaries, i.e., databases where information and its properties such as frequency stay unchanged and preference adjustments for dynamic learning can be also considered. At any time, a selection may be made between two or more results and the procedures may split decisions in several stages. First, the procedures consider how well the generated word or sequence of words may fit a particular language. If one of the compared results is better than another, then the better result is considered to be more preferable. Second, if all compared entries prove to be equal in the context of the fitting test, they are sorted according to the calculated frequency.

Results are broken into constituents and their completeness. For example, in referenced to FIG. 8, suppose a user desires to type the compound word "ballgame" at the user interface 120. After selecting all eight buttons (2-2-5-5-4-2-6-3), there are $3^8$, i.e., 6561, possible combinations. Typical examples include, but are not limited to, "ballgame" 814, "aallgame" 816, "ballhcof" 818, and "callhand" 820. The first word, "ballgame" 814, is given a high priority or rank 808 since it consists of two consecutive complete, and widely used, words. The second and third words, "aallgame" 816 and "ballhcof" 818, are less likely to be preferred by a user because they have greater TimesReset than the first word "ballgame" 814, i.e., the second word includes three segments and the third word includes four segments. Also, neither the second or third word is complete, i.e., a combinations of valid words. Similar to the first word "ballgame "814", the fourth word "callhand" 820 is also given a higher priority or rank 808 than the second and third words 816, 818. However, the fourth word "call hand" 820 has a lower priority or rank 808 than the first word "ballgame" because it received a lower score than the first word based on probability of occurrence.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A computer implemented method for performing full string evaluation of compound words comprising:
   receiving data input corresponding to at least one compound word;
   identifying word combinations of shorter words that may be combined to form at least a portion of the at least one compound word; and prioritizing word combinations based on at least one criteria, the at least one criteria including determining that word combinations having a lower total quantity of shorter words have a higher priority than word combinations having a higher total quantity of shorter words.

2. The method of claim 1, wherein prioritizing word combinations based on at least one criteria includes distinguishing word combinations forming the at least one compound word in its entirety from word combinations forming a portion of the at least one compound word.

3. The method of claim 1, further comprising scoring each word combination based on probability of occurrence.

4. The method of claim 3, wherein scoring each word combination based on probability of occurrence includes:
   determining a score for each shorter word of a particular word combination; and
   determining a score for the particular word combination by combining the scores of all shorter words of the particular word combination.

5. The method of claim 1, wherein prioritizing word combinations based on at least one criteria includes distinguishing word combinations having a particular score from word combinations having a different score.

6. The method of claim 1, wherein identifying word combinations of shorter words includes identifying all character combinations that may correspond to the data input.

7. The method of claim 1, wherein identifying word combinations of shorter words includes eliminating at least one character combination based on probability of occurrence.

8. A wireless communication device for performing full string evaluation of compound words comprising:
   a user interface configured to receive data input corresponding to at least one compound word;
   a processor, coupled to the user interface, configured to identify word combinations of shorter words that may be combined to form at least a portion of the at least one compound word; and
   a display, coupled to the processor, configured to show the word combinations in a priority based on at least one criteria, the at least one criteria including determining that word combinations having a lower total quantity of shorter words have a higher priority than word combinations having a higher total quantity of shorter words.

9. The apparatus of claim 8, further comprising a database, coupled to the processor, configured to store a plurality of shorter words but omit at least one compound word.

10. The apparatus of claim 8, further comprising a transceiver, coupled to the processor, configured to transmits a message that includes at least one compound word identified by the processor.

11. The apparatus of claim 8, wherein, at any given time, the display shows one of either the word combination having the higher priority and a plurality of word combinations in priority order.

12. The apparatus of claim 8, wherein the at least one criteria includes distinguishing word combinations forming the at least one compound word in its entirety from word combinations forming a portion of the at least one compound word.

13. The apparatus of claim 8, wherein the processor scores each word combination based on probability of occurrence.

14. The apparatus of claim 8, wherein a score for a particular word combination corresponds to a combined score of all shorter words of the particular word combination.

15. The apparatus of claim 8, wherein the at least one criteria includes distinguishing word combinations having a particular score from word combinations having a different score.

* * * * *